UNITED STATES PATENT OFFICE.

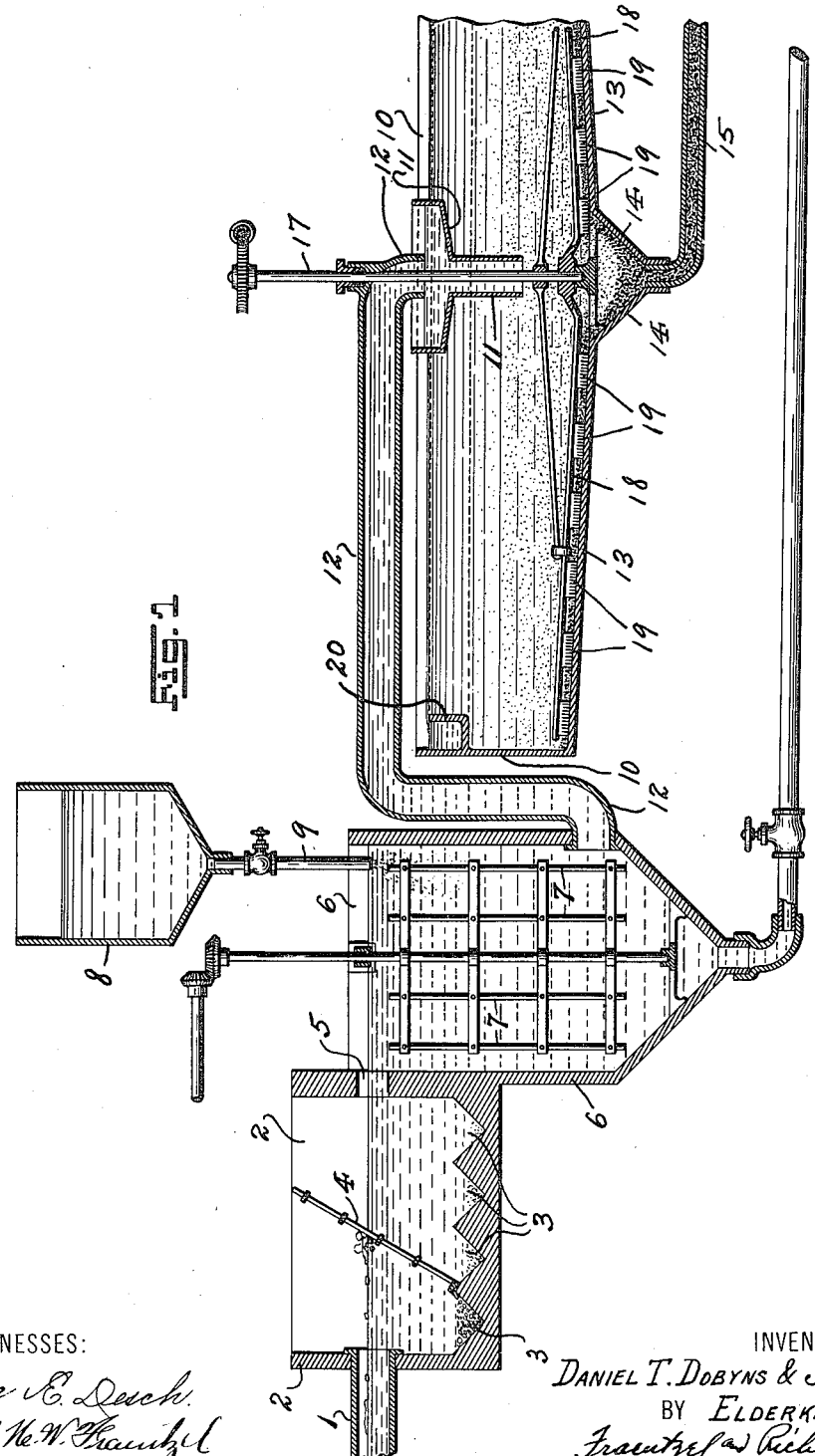

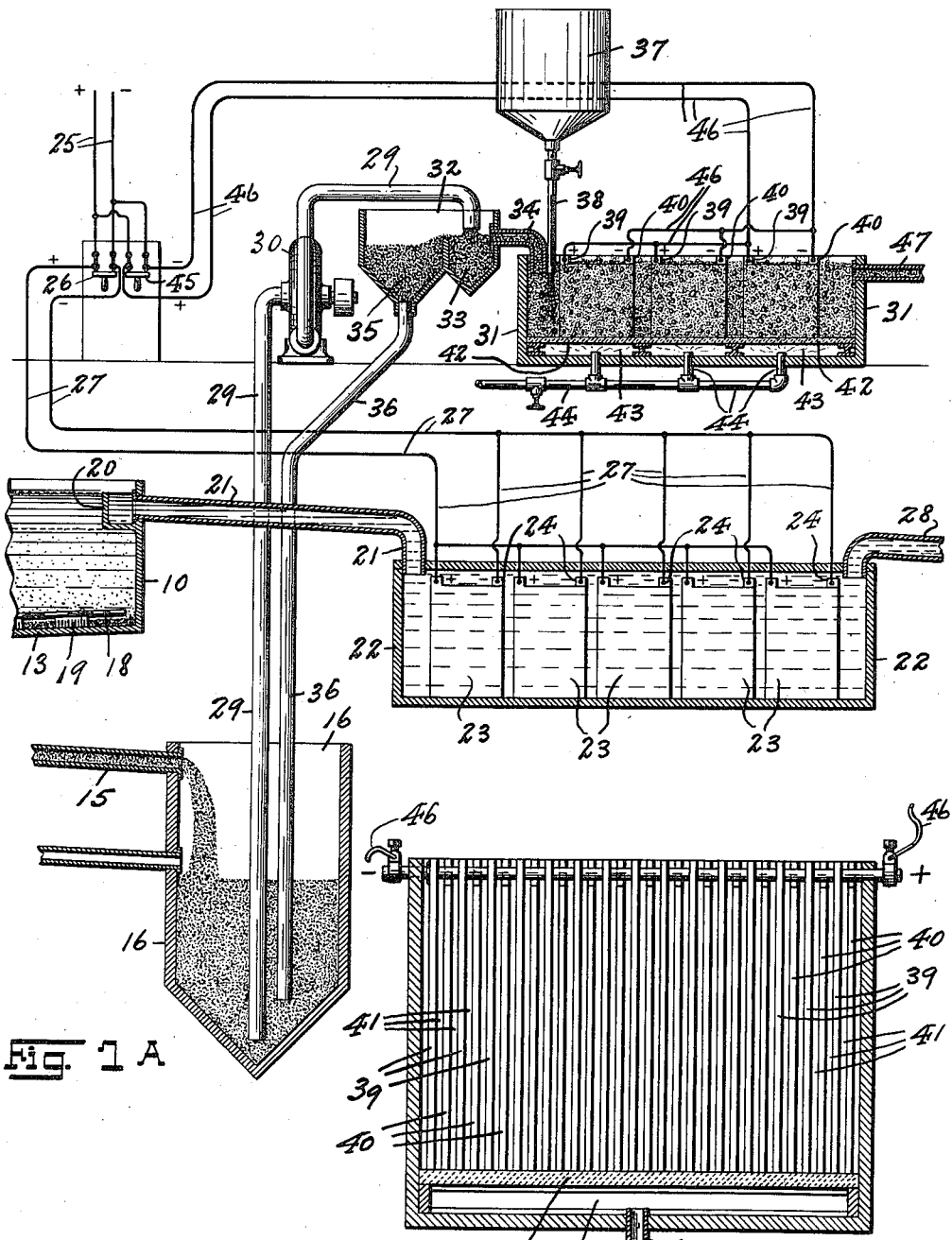

DANIEL T. DOBYNS AND JAMES K. ELDERKIN, JR., OF NEWARK, NEW JERSEY, ASSIGNORS TO CLARK PROCESS CORPORATION, A CORPORATION OF DELAWARE.

METHOD OF PURIFYING SEWAGE AND THE LIKE.

1,194,000.          Specification of Letters Patent.      Patented Aug. 8, 1916.

Application filed December 22, 1915. Serial No. 68,138.

*To all whom it may concern:*

Be it known that we, DANIEL T. DOBYNS and JAMES K. ELDERKIN, Jr., both citizens of the United States, residing at Newark, in the county of Essex and State of New Jersey, have invented certain new and useful Improvements in Methods of Purifying Sewage and the like; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to a novel improved method of purifying sewage and other waste fluids; and the invention has reference, more particularly, to a novel and improved method or process of treating sewage and other waste fluids for the purpose of rendering inactive or non-putrescent the putrescible organic matter contained in the same, and of removing or destroying the dangerous pathogenic or other bacteria content thereof, so that purified products of said sewage and other waste fluids may be disposed of without danger to health or the pollution of streams and other places where final disposal of the same takes place.

The general practice in sewage disposal has been to separate the solids therefrom by sedimentation or filtration, and then to aerate the effluent remaining in order to take into solution therewith atmospheric oxygen before discharging the same into streams or other places. The separated solids, known as sludge, not being emptied into public waters, comes under the especial jurisdiction of local authorities, while the effluent, because of riparian rights and considerations of public health, falls under the jurisdiction of State authorities, when discharged into running streams or other bodies of water. It follows, therefore, that in a practical sewage purification treatment, the effluent must be rendered stable, that is it must be supplied with sufficient oxygen in solution to oxidize and render non-putrescible the organic matter contained therein so that the dissolved oxygen content of the public waters into which the effluent is discharged is not depleted and its proportion lowered so as to result in an objectionable pollution, and the sludge or solid content of the sewage remaining must be so treated as to negative its putrescible characteristics, and to destroy its bacteria content as well as its character as a breeding ground for the latter and thus avoid giving rise to a local nuisance or local health menace. The treatment of sewage effluent by aeration methods to the proper degree of efficiency is expensive and requires a considerable area of land. Atmospheric oxygen is slow to act and great quantities must be used in order to secure a very small dissolved oxygen content, hence the aeration system is slow and expensive. The treatment of the sludge must be thorough in method to secure a proper non-putrescible character thereof and the destruction of the bacteria content thereof.

It is therefore the principal object of our present invention to provide a novel combination of mechanical, chemical and electrochemical process steps which makes for a highly efficient and economical purification treatment for sewage and other waste fluids, whereby most of the advantages obtained by various old methods of treatment are retained with additional advantages, economy and efficiency due to and resulting from the practice of our present novel method of treatment, so that a more thorough degree of purification of the sewage is obtained in a smaller plant area, by a continuous operation, and at cheaper cost, and whereby the demands of both State and local authorities as to the final disposal thereof are easily complied with.

The present invention consists, primarily, in first separating from the raw sewage as received from the mains the solid content or sludge (consisting of solids removed from suspension, bacteria, etc.) from the effluent (consisting of water with matter in solution, and with a minimum amount of matter in suspension and germs), then subjecting the solid content or sludge to an electrochemical treatment in the presence of a suitable germicide or sterilizing agent, and then subjecting the effluent to another and separate electro-chemical treatment to supply the same with sufficient dissolved oxygen to render the same thoroughly stable and fit for discharge into public streams or waters without danger of polluting the latter; this method of treatment being carried on as a continuous operation so as to dispose of the sewage as fast as the same is received or supplied.

We are aware that it has been heretofore attempted by various methods, and with several different types of apparatus, to subject raw sewage to electro-chemical purification treatment, without previous separation of the solid content thereof from the liquid or effluent, that is, the raw sewage comprising the whole combined solid and liquid content has been passed through an electrolyzer for the purpose of causing the oxidation of organic or oxidizable inorganic matter carried by such sewage both in solution and suspension, and then separating the solids therefrom subsequent to such treatment by some sedimentation step.

The disadvantages of such methods have been overcome by our novel method of sewage purification, whereby separation of the solid from the fluid content of the sewage followed by separate electro-chemical treatment of the products of such separation render possible to combine with the electro-chemical treatment of the separated solids the economical and efficient use of a proper chemical for the production of a germicide, whereby a minimum effective quantity of the latter is brought directly and actively into contact with the comparatively small proportion of said sewage represented by the separated solids or sludge, and our whole purification treatment may be practised with a great saving of time, occupied space, and electric current consumption, to say nothing of the more thorough purification results obtained.

In the here following specific description of our novel sewage purification method, reference may be had to the accompanying drawings for a thorough understanding of the same, and to that end Figure 1 and Fig. 1ᴬ, taken together, represent a diagrammatic illustration of one suitable form and arrangement of apparatus which may be employed to carry out our novel process. Fig. 2 is a detail cross section of one form of an electrolyzer adapted to be used in the treatment of the separated solids or sludge.

Similar characters of reference are employed in the above-described views, to indicate corresponding parts.

Referring now to said drawings the reference character 1 indicates an incoming or delivering sewer-main, through which the sewage is received for treatment. The incoming raw sewage is first delivered to any suitable form and construction of grit chamber, indicated by the reference character 2. This grit chamber 2 is provided at its bottom portion with suitably disposed hopper spaces 3, and situated within the grit chamber is a suitably disposed screen 4, of any desirable construction. The raw sewage enters this grit-chamber 2, at one side thereof, through said sewer-main 1 which is connected therewith, and the same flows through the screen 4, so that any coarse floating or moving material, such as sticks, paper, rags, etc., are caught and held back by the said screen. It is also in this grit-chamber 2 that any pebbles, sand, grit, etc., carried or moved by the flow of sewage, is separated therefrom, since such particles being heavy, quickly sink to the bottom and fall into the hopper spaces 3, from which the same can be subsequently removed. From this grit-chamber 2 the sewage flows through the outlet opening 5 thereof into an agitating chamber 6, which is provided at its bottom end, if desired, with a flush-pipe 6' through which the chamber 6 may be flushed or cleaned, the said flush-pipe 6' connecting with the sump pit 16 subsequently described. Mounted to rotate in said agitating chamber 6 is a suitable agitator or mixer-element 7. Arranged above said agitating chamber 6 is a chemical reagent supply-tank 8, the feed-pipe 9 of which delivers into the sewage passing through said agitating chamber 6 a proper proportion of some suitable chemical coagulant or reagent, which is thoroughly mixed with the raw sewage by said agitator or mixer-element 7. We prefer to use as the chemical coagulant calcium oxid in the following proportions, to wit, 2000 pounds per million gallons of raw sewage, of course this proportion may be widely varied depending upon the character of the raw sewage and the thoroughness of precipitation required. This calcium oxid is slacked in water and then a surplus of water added thereto to form milk of lime (calcium hydroxid). Of course other chemical coagulants can be used such as lime and ferric sulfate, lime and ferrous sulfate, lime and aluminum sulfate, aluminum sulfate, ferric sulfate, ferrous sulfate, ferrous sulfate ferric sulfate and aluminum sulfate. When this chemical coagulant is thoroughly mixed with the raw sewage, it causes the suspended matter or colloidal matter or both to coagulate or draw together in the form of flock, which has a specific gravity a little higher than water, and consequently when the raw sewage is brought to a comparatively quiet state the coagulation takes place and this flock begins to settle or sink, attracting, combining and carrying with it suspended matter.

The reference character 10 indicates a settling or separator tank. This tank is provided with a centrally located loading-well 11, with which communicates the feeding flume 12 leading from the above-mentioned agitating chamber 6. The said loading well 1 serves to break the velocity of the inflowing sewage from the agitating chamber 6 so as to admit the same into said separator tank 10 with as little disturbance as possible. The bottom 13 of the said separator tank 10 pitches or slopes uniformly toward the center of the same and there connects with a sludge receiving cone or pit 14, with which is connected a suitable conduit 15 for carrying or conveying the sludge to a sump or receiving well 16. Rotated by a vertical driving shaft 17 is a scraper or sludge collecting device, consisting of a plurality of radiating arms 18 upon which are mounted scraper members 19 which contact with said sloping bottom 13, and by their movement gradually sweep the sludge collected upon said bottom down the slope of the same and into said sludge receiving cone or pit 14. Close to the top of said separator tank 10, and extending around the inner side of its walls, is a weir or conduit 20 into which overflows the clarified fluid or effluent from which the solids or sludge has been removed. Communicating with this weir or conduit 20 is a suitable flume or conduit 21 through which said clarified fluid or effluent flows on to be further treated in a manner subsequently to be described. As soon as the sewage is brought to a comparatively quiescent state in said separator tank 10 the coagulation or flocculation, due to the presence therein of the above described chemical coagulant, takes place. This action results in the formation of a flock, comprising the solids, coagulated and withdrawn from suspension in the liquid of the sewage, this flock settles to the bottom 13 of the separator tank 10, and thus forms the separated sludge which is collected and carried away from the separator tank 10 as already described. The solids thus being separated by coagulation and flocculation leave the remaining liquid of the sewage at the top of the tank 10 clarified and practically free from suspended matter or solids, thus forming an effluent which overflows into the weir or conduit 20, and is thence carried off for further treatment. The sewage has now been separated into two different products, to wit, a sludge, consisting of solids removed from suspension, bacteria, coagulated colloids, etc., with just sufficient water to render the mass fluid, and an effluent, consisting of water with matter in solution and practically free from matter in suspension, germs, etc.

The effluent passes through the flume or conduit 21 into an effluent electrolyzer apparatus 22, in which are mounted banks of electrodes, comprising alternating anodes or positive electrodes 23 and cathodes or negative electrodes 24, between which the effluent flows. The electric current wires 25, switch 26 and feed wires 27, said electrodes being connected in series, multiple or in any other desirable way. Connected with said effluent electrolyzer apparatus is a suitable discharge flume or conduit 28 through which the treated effluent may be discharged into a stream, body of water or any other suitable place.

The sludge is delivered from the separator tank 10 to said sump or receiving well 16 and from that point it is conveyed through suitable conduits 29, by the aid of a pump 30, to a sludge electrolyzer apparatus 31. The admission of the sludge to said sludge electrolyzer apparatus is controlled by a weir-box 32 into which the sludge is pumped. This weir-box 32 has a receiving compartment 33 with which is connected a delivery flume or conduit 34 leading into the sludge electrolyzer apparatus 31. Adjoining this compartment 33 is an overflow receiving compartment 35, the same communicating by means of a return conduit 36 with the sump or receiving well 16. If a volume of sludge greater than is required to provide sufficient discharge or flow into the sludge electrolyzer apparatus 31 to maintain said sludge at the desired level in said latter apparatus is forced up by the pump 30, the surplus sludge overflows into the overflow receiving compartment 35, and from there is returned through the return conduit 36 to said sump or receiving well 16. In this way a constant head is maintained over the outflow from the weir-box 32, and thus a constant measured quantity of sludge is maintained in passage through the sludge electrolyzer apparatus 31, and the level of the volume of sludge in the latter is constantly maintained. Located adjacent to the receiving end of said sludge electrolyzer apparatus 31 is chemical supply tank 37 in which is contained a supply of some suitable chemical for the production of a germicide. The feed-pipe 38 leading from said supply tank 37 enters said receiving end of said sludge electrolyzer apparatus so as to deliver, for mixture with the incoming sludge, a proper quantity of said chemical. We prefer to use as the most desired chemical to produce an effective germicide, common salt (sodium chlorid) which enters into solution with the incoming sludge so as to be present therein during the electrolytic action. Said sludge electrolyzer apparatus 31 contains banks of electrodes, comprising alternating anodes or positive electrodes 39 and cathodes or negative electrodes 40, arranged with intervening restricted spaces 41 therebetween through which the sludge to be treated passes. Beneath said banks of electrodes is a porous partition plate or wall 42, such as filtrous plate, beneath which is left an air space or chamber 43 into which is introduced, through the air supply pipes 44, air under pressure. The air thus introduced passes through the porous partition plate 42 and bubbles upward through the mass of sludge thereby agitating and keeping the same in motion so that all the sludge is brought fully into contact with the electrodes and for certain electro-chemical effects to be subsequently described. The electric current is supplied through the circuit wires 25, switch 45 and feed wires 46, said electrodes being connected in series, multiple or in any other desirable way. Connected with the outlet end of said sludge electrolyzer apparatus 31 is a discharge flume or conduit 47, through which the treated sludge is discharged, after which it may be dewatered or dried and then disposed of in any way desired.

Of course it will be apparent that the separated products of the sewage, to wit, the sludge and the effluent, may be, and in practice are, treated simultaneously in their respective electrolyzer apparatus.

Having thus described the steps of the novel process and described suitable forms of apparatus by the aid of which it may be practised, we will now relate, in more particularity, the occurrences resulting from its practice, and the advantages gained by the said novel method of treatment.

The method, steps and occurrences leading up to and including the separation of the sewage into two products for separate treatment, to wit into sludge and effluent, will be clearly understood from the above description without further reiteration.

After the solids have been separated from the sewage to form the effluent or clarified liquid, the latter still contains organic matter or putrescible matter in solution which must be oxidized to render it non-putrescible and purged of impurities, germs, etc. The process or step by which the latter result is obtained is performed by the electro-chemical activity set up in the effluent electrolyzer apparatus. A direct electric current is passed through the electrodes, the same passing from the anodes or positive electrodes through the electrolyte, provided by the effluent surrounding the electrodes, to the cathodes or negative electrodes, producing the electro-chemical activities of electrolysis. Electrolysis produces at the positive electrode or anode the release or freeing of nascent oxygen, which is oxygen in its most intense and active form. This nascent oxygen being liberated in the presence of the organic matter contained in the effluent directly attacks the same and decomposes it. The higher forms of organic matter and bacteria, etc., are split up into simpler forms by the electric current, and are then attacked and oxidized by the nascent oxygen. Such oxygen as may be in excess of actual need for such oxidation is taken up in solution by the effluent thereby tending to raise the dissolved oxygen content thereof, when finally discharged, and thereby insuring a high degree of stability.

The sludge is drawn from the bottom of the sump or receiving well 16, where the accumulation is heaviest and most compact, and is conveyed to the sludge electrolyzer apparatus. As the sludge flows into the electrolyzer, a certain amount of salt (sodium chlorid) is added thereto to form an aqueous solution, preferably in the general proportion of one pound of salt to twenty gallons of sludge, and of course this proportion may be widely varied according to the character of the sludge and the degree of purification required. This sludge contains great numbers of bacteria and a large amount of readily putrescible organic matter, hence it must be thoroughly sterilized, and have the organic matter reduced to an inoffensive non-putrescible form. The most successful way to sterilize the sludge, that is, to kill the bacteria, etc., is to use a germicide, and the most effective way to reduce the organic matter to a non-putrescible state is to attack it with nascent oxygen. Now hypochlorites are well known germicides and can readily be obtained with simultaneous production of nascent oxygen as a product of electrolytic action. Hence, the sludge is converted into an impure sodium chlorid solution and then subjected to electrolytic action in the sludge electrolyzer 31. A direct electric current is passed through the electrodes, the same passing from the anodes or positive electrodes through the electrolyte, provided by the combined sludge and sodium chlorid surrounding the electrodes, to the cathodes or negative electrodes. The anodes and cathodes being placed near together (as shown in Fig. 2 of the drawings) and the electrolyte, formed by the combined sludge and sodium chlorid, being kept in steady motion by the bubbling up of compressed air therethrough, as above described, the anodic and cathodic products are mixed together, with the result that both sodium hypochlorite and oxygen in nascent state are produced in the immediate presence of the organic matter and bacteria of which the sludge is comprised. It follows that the germicide (hypochlorite) thus produced destroys the bacteria or germs and the nascent oxygen directly attacks and reduces the putrescible organic matter to a non-putrescent and inoffensive state. The sludge thus treated is discharged from the sludge electrolyzer 31, whereupon it may be dewatered to leave an earthy negative or sterile product which is inoffensive and non-putrescible, and which may be disposed of anywhere without danger of creating a nuisance or menace to health.

Of course it will be clearly understood that the principal or important step in our novel process, as above described, consists in separating the raw sewage into its two constituents of liquid or effluent, more or less contaminated, and solids or sludge which is highly contaminated, putrescible and offensive.

By thus isolating the solids or sludge for separate treatment, we are able to concentrate an intense oxidizing and sterilizing effect, produced by electrolytic activity, upon this most highly contaminated and offensive portion of the sewage. This concentrated and intense oxidation and sterilization is necessary to secure a proper degree of purification, since the solids or sludge comprise comparatively coarse or large particles of easily putrescible material, and that which offers the most resistance to oxidation. The effluent or liquid portion of the sewage may also be more advantageously and economically treated, after the solids or sludge has been separated or removed therefrom, since the oxidizable matter present therein is so minutely subdivided that it readily and quickly yields to the oxidizing effect of oxygen produced by the electrolytic treatment given it. The sludge from a million gallons of sewage will average, roughly, about five thousand gallons, consequently if the raw sewage thus constituted is treated without separation, it will be necessary to subject the entire mass of sewage, liquid and solids alike, to an electrolytic treatment of the same character of duration and intensity as we give the sludge alone, in order to extend the purifying effect to the small amount of solids which are carried in the large quantity of liquid. Naturally this means increased and unnecessary expense. Therefore, by our process, the effluent may be rapidly and less intensely treated, consequently more economically, in large quantities, while the sludge, being but a small proportion of the raw sewage, yet much more difficult to purify, may be given proportionately longer and more intense treatment at small expense because of its small quantity, with the additional creation of a proper quantity of strong germicide immediately in its presence, the full effect of which is brought to bear directly on the sludge and nothing else, without danger of loss of effect by dilution in the effluent, or waste by being carried off in solution with said effluent.

Other novel features of our present process will be apparent from the above description of the same, and will be clearly identified in the herefollowing claims.

We claim:—

1. The process of purifying sewage which consists in substantially removing the solids in suspension from the liquid of the sewage, then subjecting the liquid of the sewage to electrolytic oxidation, and collecting the removed solids in a separate mass, then subjecting the separated mass to independent electrolytic oxidation.

2. The process of purifying sewage which consists in separating the liquid from the solids, adding to the separated solids a chemical which will develop under electrolytic activity a germicide, and subjecting said solids with the added chemical to electrolysis to create in the presence of said solids a chemical which reacts on the water content of the solids to produce a germicide in the form of nascent oxygen.

3. The process of purifying sewage which consists in substantially separating from the water solids, bacteria and matter in solution by chemical precipitation, then subjecting the products of said separation to independent electrolytic activity.

4. The process of purifying sewage which consists in separating the liquid from the solids, subjecting said separated solids to electrolysis to create in the presence thereof, nascent oxygen.

5. The process of purifying sewage which consists in substantially removing the solids in suspension from the liquid of the sewage, then subjecting the liquid of the sewage to intimate contact and mixture with nascent oxygen produced by electrolysis, collecting the removed solids in a separate mass, mixing therewith a chemical which under electrolytic reactions will produce a germicide, and then subjecting said mass of combined solids and chemical to independent electrolytic activity to produce in the presence of said solids both a germicide and nascent oxygen.

6. The process of purifying sewage which consists in substantially removing the solids in suspension from the liquid of the sewage, then subjecting the liquid of the sewage to intimate contact and mixture with nascent oxygen produced by electrolysis, collecting the removed solids in a separate mass, mixing therewith sodium chlorid, and then subjecting said mass to independent electrolytic activity to produce in its presence hypochlorite and nascent oxygen.

7. The process of purifying sewage which consists of introducing into and mixing with said sewage a chemical coagulant, bringing said sewage to a comparatively quiescent state wherein coagulation and flocculation induced by said chemical coagulant causes the solids to flock and substantially separate from the liquid of said sewage, then subjecting the clarified but impure liquid to electrolytic oxidation, and subjecting the separated solids to separate and independent electrolytic oxidation.

8. The process of treating sludge containing solids in the form of putrescible organic matter and bacteria which have been separated from the raw sewage which consists in adding thereto a chemical which when electrolyzed produces a germicide; then electrolyzing the sludge with its added chemical to produce said germicide in intimate relation to the sludge.

9. The process of purifying sewage which consists in first subjecting the same to chemical precipitation to produce a clarified but impure effluent comprising the water of said sewage, bacteria, and matter in solution therein, and sludge comprising solids, bacteria and matter removed from solution, adding to said sludge a chemical capable under electrolysis of liberating a germicide; subjecting said sludge with the added chemical to the influence of an electric current passed therethrough to create in its presence both a germicide and nascent oxygen, and subjecting said effluent independently to an electric current to produce nascent oxygen by dissociation of part of the water of said effluent.

10. The process of treating sewage which consists in extracting from the raw sewage a sludge containing solids in the form of putrescible organic matter and bacteria, conveying said sludge to an electrolyzer having closely spaced and alternated anodes and cathode electrodes between which the sludge is caused to pass, mixing with the sludge prior to introduction to the electrolyzer, sodium chlorid, passing an electric current through the sludge, and causing a motion of said sludge between the anode and cathode electrodes to mix the anodic and cathodic products to obtain from said sodium chlorid solution a hypochlorite and nascent oxygen in the immediate presence of said sludge.

11. The process of purifying sewage which consists in adding to the raw sewage milk of lime, bringing said raw sewage to a quiescent state whereby the flocculent action of the milk of lime precipitates the solids or sludge containing putrescible material and bacteria out of the liquid of said sewage, then conveying the clarified but impure liquid to an electrolyzer where by means of direct electric current passed through the liquid, part of the water of the liquid is dissociated and nascent oxygen is liberated in intimate contact with the impurities of said liquid, adding sodium chlorid to said solids or sludge, then conveying said solids or sludge to a separate electrolyzer where by means of direct electric current passed through said sludge a hypochlorite is formed from said sodium chlorid in solution and nascent oxygen liberated in the presence of said sludge.

In testimony that we claim the invention set forth above we have hereunto set our hands this 21st day of December, 1915.

DANIEL T. DOBYNS.
JAMES K. ELDERKIN, Jr.

Witnesses:
JAMES M. CLARK,
GEORGE D. RICHARDS.